United States Patent
Croshaw

Patent Number: 5,265,933
Date of Patent: Nov. 30, 1993

[54] CONTINUOUS LOOP SEAT COVER FASTENING SYSTEM

[75] Inventor: Steven P. Croshaw, Mendon, Utah

[73] Assignee: Saddleman, Inc., Logan, Utah

[21] Appl. No.: 959,696

[22] Filed: Oct. 13, 1992

Related U.S. Application Data

[63] Continuation of Ser. No. 763,353, Sep. 20, 1991, abandoned.

[51] Int. Cl.$^5$ .............................................. A47C 27/00
[52] U.S. Cl. ................................. 297/228.1; 297/229
[58] Field of Search ............... 297/218, 219, 224, 225, 297/228, 226, 229, 382, 441

[56] References Cited

U.S. PATENT DOCUMENTS

| | | | |
|---|---|---|---|
| 1,820,104 | 8/1931 | Whaley | 297/229 X |
| 1,836,302 | 12/1931 | Bloomfield | 297/229 |
| 2,229,160 | 1/1941 | Wittcoff | 297/224 |
| 4,396,227 | 8/1983 | Neilson | 297/219 |
| 4,669,779 | 6/1987 | Kaganas et al. | 297/229 |
| 4,676,549 | 6/1987 | English | 297/224 |
| 4,693,511 | 9/1987 | Seltzer et al. | 297/224 X |
| 4,958,886 | 9/1990 | Barattini et al. | 297/224 X |

FOREIGN PATENT DOCUMENTS

| | | | |
|---|---|---|---|
| 1511646 | 2/1968 | France | 297/219 |
| 854850 | 4/1990 | France | 297/226 |
| 483942 | 2/1970 | Switzerland | 297/218 |
| 431008 | 6/1935 | United Kingdom | 297/224 |

Primary Examiner—Jose V. Chen
Attorney, Agent, or Firm—Thorpe North & Western

[57] ABSTRACT

A seat cover fastening system for use in conjunction with a seat cover to be installed on a vehicle seat having a seat cushion portion and a seat back portion, with an open junction therebetween. The seat cover has a front panel which overlies the front of the seat back portion, and a lower extension extending downwardly from the front panel to fit through the junction. The seat cover fastening system includes a flexible sheet of material joined to the side and top edges of the front panel to extend about the sides and over the top of the seat back portion to the rear thereof, where the sheet of material terminates in a rear edge at the rear of the seat back portion. The rear edge is formed generally in the shape of an inverted U, and includes a channel extending along a substantial portion of the edge for receiving and holding a drawstring. A drawstring is disposed in the channel so that the ends thereof extend out respective ends of the channel. The ends of the drawstring include hooks to enable connecting the drawstring to the lower extension such as by loops attached to the lower extension or eyelets or grommets formed in the lower extension. In this manner, a uniform tension is applied to the sheet of material to pull the front panel smooth against the front of the seat back portion.

15 Claims, 1 Drawing Sheet

U.S. Patent  Nov. 30, 1993  5,265,933
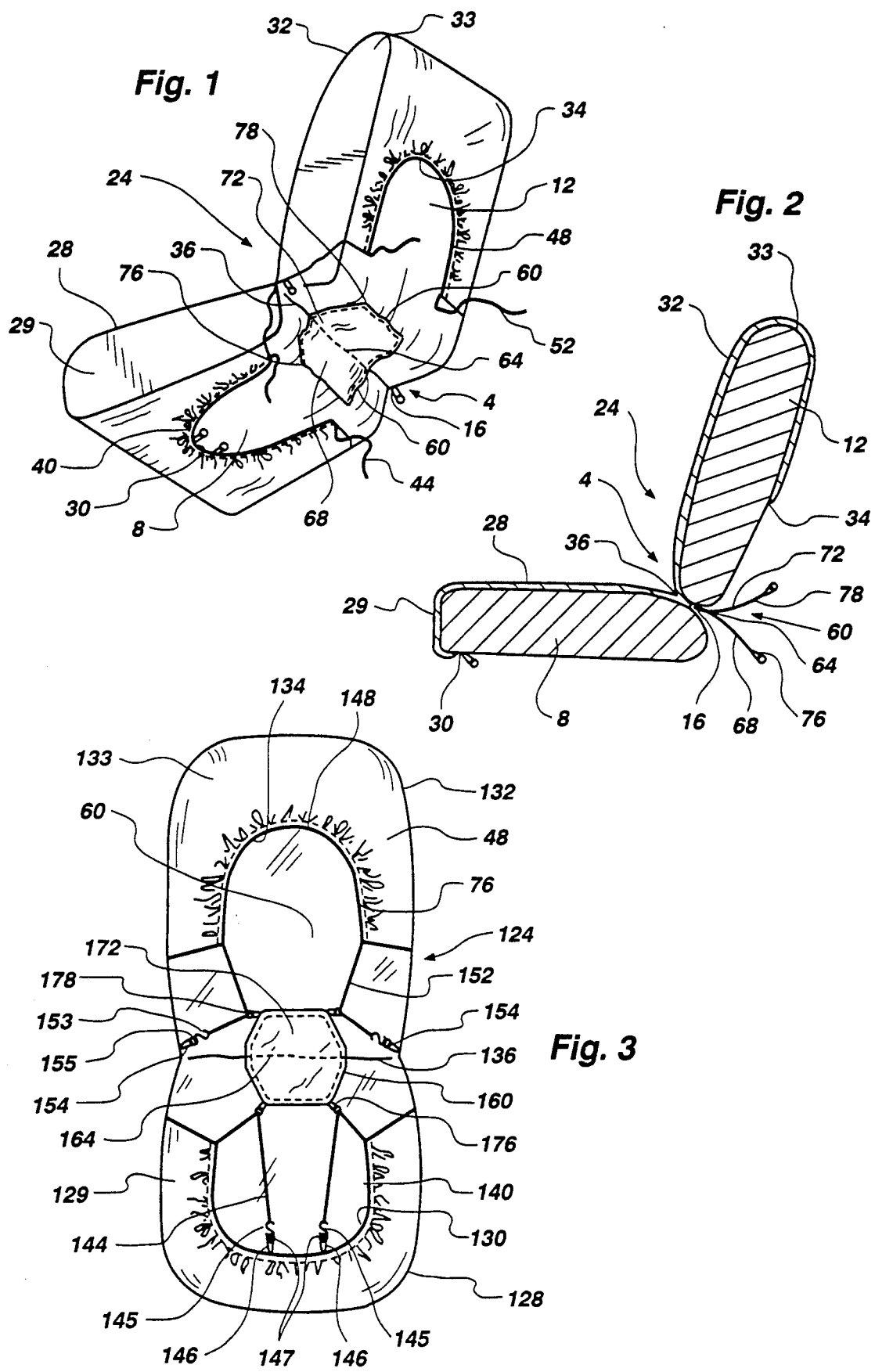

CONTINUOUS LOOP SEAT COVER FASTENING SYSTEM

This application is a continuation of application Ser. No. 07/763,353, filed Sep. 20, 1991, now abandoned.

BACKGROUND OF THE INVENTION

This invention relates to a vehicle seat cover and more particularly to a system for fastening one-piece or two-piece seat covers to a vehicle seat.

A common problem with vehicle seat covers is the tendency of those portions of the seat cover which overlie the seat cushion and the seat back to wrinkle or pucker with continued use. This is caused in part by the seat cover fastening arrangements typically used, involving fastening elements spaced apart along a rear edge (of a seat back cover portion) or a bottom edge (of a seat cushion cover portion) which are then joined to either the vehicle seat or another part of the seat cover. Because the fastening elements, such as loops or ties, are placed at discreet locations along the edges, joining the fastening elements to either the vehicle seat or other parts of the seat cover will result in nonuniform pulling on the edges of the seat cover, i.e., the pulling force will only be at the locations of the fastening elements and this can give rise to wrinkling or puckering not only at the locations of the fastening elements but also extending around to the front of the seat back cover portion or to the top of the seat cushion cover portion.

SUMMARY OF THE INVENTION

It is an object of the invention to provide a new and improved vehicle seat cover having a fastening system which minimizes puckering or wrinkling in the seat cover.

It is also an object of the invention to provide such a seat cover construction and fastening system in which the pulling force or tension applied to the seat cover to maintain it in place on a vehicle seat is applied substantially uniformly to a large area of the seat cover.

It is a further object of the invention to provide such a seat cover and fastening system which facilitates the rapid installation and removal of the cover from a vehicle seat.

The above and other objects of the invention are realized in a specific illustrative embodiment of a vehicle seat cover and fastening system which includes a front panel for overlying the front of the seat back portion of a vehicle seat, and a flexible sheet of material joined to the side and top edges of the front panel to extend about the sides and over the top of the seat back portion to the rear thereof to terminate in a rear edge which is formed generally in the shape of an inverted U. The rear edge of the flexible sheet of material is formed to define a channel extending along a substantial portion of the edge for receiving a drawstring therein. Also included is a drawstring disposed in the channel so that the ends of the drawstring extend out respective ends of the channel. A lower extension is formed on the front panel to extend downwardly from the front panel and through the junction between the seat back portion and seat cushion portion of the vehicle seat. The ends of the drawstring include implements for connecting to the lower extension to thereby form a continuous loop in the channel to the extension and apply a tension to the sheet of material to pull the front panel smooth against the front of the seat back portion.

In accordance with one aspect of the invention, both the sheet of material and the drawstring are constructed of an elastic material.

In accordance with another aspect of the invention, the implements on the ends of the drawstring are hooks which may be detachably joined to eyelets or loops formed on the lower extension of the front panel.

BRIEF DESCRIPTION OF THE DRAWINGS

The above and other objects, features and advantages of the invention will become apparent from a consideration of the following detailed description presented in connection with the accompanying drawings in which:

FIG. 1 shows a bottom, rear, perspective view of a vehicle seat cover made in accordance with the principles of the present invention and mounted on a vehicle seat;

FIG. 2 is a side, elevational, cross-sectional view of the vehicle seat cover of FIG. 1; and FIG. 3 is a rear view of another embodiment of an uninstalled vehicle seat cover made in accordance with the present invention.

DETAILED DESCRIPTION

Referring to the drawings, there is shown a conventional vehicle seat 4 (FIGS. 1 and 2) having a seat cushion part 8 and a seat back part 12, with a junction, joint or crevice 16 therebetween. The vehicle seat 4 of FIGS. and 2 is conventionally used in both automobiles and trucks. The primary feature of interest in the vehicle seat 4 as regards the present invention is that the seat has an opening at the junction 16 between the seat cushion 8 and seat back 12, for reasons which will be evident momentarily.

Also shown in FIGS. 1 and 2 is one illustrative embodiment of a seat cover 24 made in accordance with the invention. The seat cover 24 includes a hoop panel 28 formed to overlie the top of the seat cushion 8. A flexible and elastic sheet of material 29 is attached at an upper edge to the front and side edges of the top panel 28 to extend downwardly about the sides and front of the seat cushion 8 and partially underneath the seat cushion as shown. The sheet of material 29 terminates in a bottom, U-shaped edge 30 which is open rearwardly of the seat cushion part 8. The seat cushion panel 28 could be formed from a piece of material separate from the sheet of material 29, as shown in FIGS. 1 and 2, or it could be formed from a single sheet of material in which case the panel would simply extend down over the sides and front of the seat cushion 8 to terminate in the bottom edge 30. Still, alternatively, the panel 28 could be formed from a single piece of material, and then front and side panels to overlie the front and sides of the seat cushion 8 could be formed, with a separate underneath sheet which terminates in the bottom edge 30 attached to the lower edges of the front and side panels. The fastening system for that portion of the seat cover 24 which covers the seat cushion 8 will be discussed momentarily.

The seat cover 24 also includes a seat back panel 32 joined to the seat cushion panel 28 along a common transverse locus of points 36. The front panel 32 is formed to overlie the front surface of the seat back 12. A flexible and elastic sheet of material 33 is joined at a forward edge to the upper and side edges of the front panel 32 to extend about the sides and top of the seat back 12 and partly over the rear of the seat back, as shown. The sheet of material 33 terminates at the rear of the seat back 12 in an inverted U-shaped edge 34, as best seen in FIG. 1. Again, the front panel 32 may be made of a separate piece of material from the sheet of material 33 or alternatively the two may be formed of a single sheet capable of extending from the front of the seat back 12 about the sides and top of the seat back to the rear thereof. Still, alternatively, the front panel 32 may be made from a single piece of material, while separate side panels and a top panel are formed to join the side edges and upper edge respectively of the front panel, and then a separate sheet formed to partially cover the rear of the seat back 12 and joined to the rear edges of the side and top panels. Likewise, the seat cushion top panel 28 and seat back front panel 32 may be formed from a single piece of material or from separate pieces joined together to form a one-piece seat cover.

Formed in the bottom edge 30 of the sheet of material 29 is a channel 40 having a tunnel or passageway for receiving and holding an elastic tether or drawstring 44. Likewise, the rear edge 34 of the sheet of material 33 includes a channel 48 having a tunnel or passageway for receiving and holding an elastic drawstring 52. As will be explained later, the drawstrings 44 and 52 are used for securing the seat cover 24 onto the vehicle seat 4.

A dual-tongue attachment fixture of the present invention includes a rectangular, flexible sheet of material 60 folded along a midline 64 and joined at the midline to the transverse locus of points 36 of the seat cover 24. Folding the sheet of material 60 at the midline 64 defines the sheet as having a first section 68 and a second section 72, both of which extend rearwardly of the seat cover 24 and through the junction 16 between the seat cushion 8 and seat back 12 when the seat cover is installed on the vehicle seat 4 (best seen in FIG. 2). The two sections 68 and 72 have substantially the same dimensions with the contiguous edges thereof being substantially coextensive and conterminous. The sheet 60 is joined at its midline 64 along a substantial portion of the length of the transverse locus of points 36 to provide a fairly uniform force on the seat cushion panel 28 and seat back panel 32, when the seat cover 24 is installed on the vehicle seat 4. The sheet 60 may be made of a single piece of material folded at the midline 64, as described, or from two separate sheets or sections joined at respective edges to one another and to the transverse locus of points 36. The sheet 60 may be made of a sturdy cloth, leather or imitation leather or like flexible material.

Formed on the corners of the sections 68 and 72 opposite the midline 64 are loops 76 and 78 for use in coupling or tying to the drawstrings 44 and 52 respectively. For example, the loops 76 of the section 68 could illustratively be tied to respective ends of the drawstring 44 to secure the top panel 28 on the seat cushion 8. Similarly, the loops 78 of section 72 could illustratively be coupled or tied to respective opposite ends of the drawstring 52 to secure the front panel 32 on the seat back 12. By cinching or pulling the drawstrings 44 and 52 and then tying or joining them to the sections 68 and 72 respectively, the drawstrings each form a continuous loop with respective sections, and the seat cushion top panel 28 and seat back front panel 32 are pulled smoothly, and uniformly over the seat cushion 8 and seat back 12 respectively. In effect, the continuous loop configuration of the drawstrings 44 and 52 pull uniformly the bottom edge 30 and rear edge 34 to gather the sheets of material 29 and 33 at least partially along the respective edges and this, in turn, applies a substantially uniform pulling force on the top panel 28 and front panel 32 as desired. The dual-tongue sheet 60 also pulls uniformly against the transverse locus of points 36 to pull the locus toward and partway through the junction 16 and, because it is attached along the midline 64 over a substantial length of the locus 36, the pulling force is supplied and distributed uniformly to the seat cover 24 to yield a substantially pucker-free fit of the seat cover over the vehicle seat 4.

FIG. 3 shows a rear, bottom view of a seat cover 124 similar in construction to seat cover 24 of FIGS. 1 and 2, but having a different fastening system. The seat cover 124 includes a top panel 128 and a downwardly extending sheet of material 129 which terminates in a bottom U-shaped edge 130 having a channel 140 formed therein. Disposed in the channel 130 is an elastic drawstring 144, on the ends of which are fastened hooks 145. Attached to the bottom edge 130 of the sheet of material 129 at spaced-apart locations forwardly of the top panel 128 are a pair of loops 146 which are looped about D-rings 147.

The seat cover 124 also includes a front panel 132 for overlying the front of a seat back and a flexible and elastic sheet of material 133 extending rearwardly from the top and side edges of the front panel to terminate in a rear inverted U-shaped edge 134. Formed in the rear edge 134 is a channel 148 for receiving and holding an elastic drawstring 152, as with the seat cover 24 of FIGS. 1 and 2. Attached to the ends of the drawstring 152 are hooks 153. Attached on opposite sides of the front panel 132, near the common locus 136 between the front panel 132 and top panel 128 are loops 154, in which are secured D-rings 155.

A dual-tongue sheet 160 is attached along its midline 164 to the common locks of points 136 between the front panel 132 and top panel 128, again generally as in the case of the seat cover of FIGS. 1 and 2. The dual-tongue sheet 160 in the embodiment of FIG. 3, however, includes eyelets or grommets 176 and 178 located in the corners of the sheet opposite the midline 164. The grommets 176 and 178 are provided to allow insertion therethrough of drawstrings 144 and 152 respectively so that hooks 145 and 153 may be hooked on respective D-rings 147 and 155, as shown in FIG. 3.

With the fastening system embodiment of FIG. 3, the drawstrings 144 and 152, when cinched or pulled in their respective channels and hooked to respective D-rings, form continuous loops to pull uniformly along the bottom edge 130 and rear edge 134 to provide a uniform force pulling on top panel 128 and front panel 132 to substantially eliminate wrinkles and puckering.

Although specific fastening arrangements are shown in FIGS. 1-3, it should be understood that a variety of other arrangements might be provided for securing the seat cushion top panel (28 and 128) and seat back front panel (32 and 132) to the vehicle seat. For example, the drawstrings carried by the U-shaped channels could be secured directly to the vehicle seat or to other parts of the seat cover other than the dual-tongue sheet (60 and 160) shown in the drawings. Also, the U-shaped channels with drawstrings could be employed in two-piece seat covers where, for example, the section 68 of the dual-tongue sheet 60 (FIGS. 1 and 2) constitutes an extension of the top panel 28 and is not joined to the section 72. In such case, the section 68 would simply be joined to the drawstring 44 as shown in FIG. 1 or as shown in FIG. 3. The section 72 of the dual-tongue sheet 60 could then be formed to simply constitute an extension of the front panel 32 and be joined directly to the drawstring 52. Also, although the dual-tongue sheet 60 (FIGS. 1 and 2) and 160 (FIG. 3) is shown as having loops or grommets, the dual-tongue sheet could be formed with tethers or other fastening elements in place of the loops and grommets for joining to the drawstrings or other fastening elements attached to the bottom and rear edges of the seat cushion cover and seat back cover.

It is to be understood that the above-described arrangements are only illustrative of the application of the principles of the present invention. Numerous modifications and alternative arrangements may be devised by those skilled in the art without departing from the spirit and scope of the and the appended claims are intended to cover such modifications and arrangements.

What is claimed is:

1. In a seat cover for installation on a vehicle seat having a seat cushion portion and a seat back portion, with an open junction therebetween, said seat cover having a front panel, with side and top edges, which overlies the front of the seat back portion, and a lower extension extending downwardly from the front panel to fit through the junction, said seat cover also having a top panel, with side and front edges, which overlies the top of the seat cushion portion, and a rear extension extending backwardly from the top panel to fit through the junction, underneath the lower extension, said lower extension and rear extension defining an attachment fixture means, a seat cover fastening system comprising a flexible sheet of material joined to the side and top edges of the front panel to extend about the sides and over the top of the seat back portion to the rear thereof, said sheet of material terminating in a rear edge at the rear of the seat back portion, and formed generally in the shape of an inverted U, said rear edge including a channel extending along a substantially portion of the edge for receiving a drawstring therein, a drawstring disposed in the channel so that the ends of the string extend out respective ends of the channel, and means for connecting the ends of the drawstring to the lower extension to thereby apply a substantially uniform tension to the sides and top of said sheet of material and simultaneous tension to the lower extension to pull the front panel smooth against the front of the seat back portion, a second flexible sheet of material joined to the side and front edges of the top panel to extend over the sides and front of the seat cushion portion to the bottom thereof, said second sheet of material terminating in a bottom edge underneath the seat cushion portion, and formed generally in the shape of a U, said bottom edge including a second channel extending along a substantially portion of the edge for receiving a drawstring therein, a second drawstring disposed in the second channel so that the ends of the second drawstring extend out respective ends of the channel, and second means for connecting the ends of the second drawstring to the rear extension to thereby apply a substantially uniform tension to the sides and front of the second sheet of material and simultaneous tension to the rear extension to pull the top panel smooth against the top of the seat cushion portion.

2. A seat cover fastening system as claimed in claim 1 wherein said sheet second sheet are made of an elastic material.

3. A seat cover fastening system as in claim 1 wherein said connecting means comprises
   hooks attached to the ends of the drawstring, and
   means formed on the lower extension for receiving and holding the hooks under tension to thereby pull said sheet of material taut about the sides and over the top of the seat back portion.

4. A seat cover fastening system as in claim 3 wherein said second connecting means comprises
   hooks attached to the ends of the second drawstring, and
   second means formed on the rear extension for receiving and holding the hooks under tension to thereby pull said second sheet of material taut about the sides and over the front of the seat cushion portion.

5. A seat cover fastening system as in claim 4 wherein said second receiving and holding means comprise a pair of grommets formed at spaced-apart locations in said rear extension near the rear edge thereof, through with respective ends, with hooks, of the second drawstring may be threaded, and
   a pair of fastening elements attached at spaced-apart locations to the bottom edge of the second sheet of material, to which respective hooks may be fastened after being threaded through the grommets in the rear extension.

6. A seat cover fastening system as in claim 5 wherein said fastening elements each comprises a loop attached to said bottom edge, and a ring secured in the loop for receiving a respective hook.

7. A seat cover fastening system as in claim 3 wherein said receiving and holding means comprise eyelets formed in said lower extension near the lower edge thereof.

8. A seat cover fastening system as in claim 3 wherein said receiving and holding means comprise loops attached to said lower extension.

9. A seat cover fastening system as in claim 1 wherein said drawstrings are elastic.

10. A seat cover fastening system as in claim 1 wherein said connecting means comprises
    a pair of grommets formed at spaced-apart locations in said lower extension near the lower edge thereof, through which respective ends of the drawstrings may be threaded,
    a pair of fastening elements, each attached to a respective side edge of the front panel, and
    means attached to the ends of the drawstring for detachably joining the strings to respective fastening elements.

11. A seat cover fastening system as in claim 10 wherein said fastening elements each comprises a loop attached to a respective side edge of the front panel, and a ring secured in the loop, and wherein the joining means comprise hooks for hooking onto respective rings.

12. A seat cover for fitting over a vehicle seat having a seat cushion and a seat back separated by an open junction, said seat cover comprising
    a seat cushion cover having a top panel, side panels and a forward panel for overlying respectively the top, sides and front of the seat cushion, and having a bottom panel extending from the lower edges of the side and forward panels underneath the seat cushion to terminate in a continuous U-shaped bottom edge, opening toward the rear of the seat cushion, said bottom edges being formed with a first duct for receiving a drawstring, a seat back cover having a front panel, side panels and an upper panel for overlying respectively the front, sides and top of the seat back, and having a rear panel extending from the rear edges of the side and upper panels behind the seat back to terminate in a continuous inverted U-shaped rear edge, opening toward the bottom of the seat back, said rear edge being formed with a second duct for receiving a drawstring, the lower edge of the front panel of the seat back cover and the rear edge of the top panel of the seat cushion cover being joined along a common transverse locus which lies adjacent the open junction between the seat cushion and seat back when the seat cover is fitted over the vehicle seat, an attachment fixture means comprising first and second flexible sheets attached to and extending rearwardly from the common locus of the front panel and top panel, the first sheet being disposed below the second sheet, to fit through the open junction between the seat back and seat cushion, a first drawstring disposed in the first duct so that the ends thereof extend out respective ends of the first duct, a second drawstring disposed in the second duct so that the ends thereof extend out respective ends of the second duct, first means for connecting the ends of the first drawstring to the first sheet to thereby draw the first string taut in the first duct, gather the bottom panel along the bottom edge, and pull the top panel smooth over the top of the seat cushion, and second means for connecting the ends of the second drawstring to the second sheet to thereby draw the second string taut in the second duct, gather the rear panel along the rear edge, and pull the front panel smooth over the front of the seat back.

13. A seat cover as in claim 12 wherein said first connecting means comprises a first pair of hooks, each attached to a respective end of the first drawstring, and a first pair of grommets formed in the first sheet, to which respective hooks may be attached, wherein said second connecting means comprises a second pair of hooks, each attached to a respective end of the second drawstring, and a second pair of grommets formed in the second sheet, to which respective second hooks may be attached, 14. A seat cover as in claim 13 wherein said first connecting means further comprises a pair of rings attached at spaced-apart locations to the bottom edge for receiving and holding respective first hooks which have been threaded through respective first grommets, along with corresponding ends of the first drawstring, and wherein said second connecting means further comprises a second pair of rings attached to respective side panels of the seat back cover for receiving and holding respective second hooks which have been threaded through respective second grommets, along the corresponding ends of the second drawstring.

15. A seat cover as in claim 12 wherein said first and second drawstrings are elastic.

* * * * *